United States Patent [19]

Kennedy et al.

[11] Patent Number: 4,888,389

[45] Date of Patent: Dec. 19, 1989

[54] AMPHIPHILIC POLYMERS AND METHOD OF MAKING SAID POLYMERS

[75] Inventors: Joseph P. Kennedy; Yuji Hongu, both of Akron, Ohio

[73] Assignee: University of Akron, Akron, Ohio

[21] Appl. No.: 698,453

[22] Filed: Feb. 5, 1985

[51] Int. Cl.$^4$ ................................................ C08F 8/00
[52] U.S. Cl. .................................... 525/131; 525/130; 528/75
[58] Field of Search ................... 525/131, 130; 528/75

[56] References Cited

U.S. PATENT DOCUMENTS 4,057,598 11/1977 Lundberg et al. ................ 525/130
4,276,394 6/1981 Kennedy et al. .................. 525/244
4,396,053 8/1983 Davis et al. ........................ 528/75

Primary Examiner—Melvyn I. Marquis
Attorney, Agent, or Firm—Oldham & Oldham

[57] ABSTRACT

Amphiphilic polymers having poly A segments of wide molecular weights, viz., about 2,000 to 50,000, and poly B segments of wide molecular weight of a few hundred to 13,000 or more can be made by reacting without regard to sequence, isocyanate with either a poly A segment or a poly B segment to give an adduct containing free NCO groups on each segment and then react the adduct with the other segment.

17 Claims, No Drawings

AMPHIPHILIC POLYMERS AND METHOD OF MAKING SAID POLYMERS

TECHNICAL FIELD

This invention relates to amphiphilic polymers and a method of making said polymers. More particularly, this invention relates to amphiphilic polymers containing urethane groups and having at least one hydrophobic chain segment and at least one hydrophilic chain segment. Specifically, this invention relates to amphiphilic polymers prepared by coupling an organic polyisocyanate, specifically a diisocyanate, with a hydroxyl aromatic terminated polyolefin to cap said polyolefin and then reacting the isocyanate capped polyolefin with a hydroxyl terminated polyolefin oxide to give a polymer having hydrophobic and hydrophilic segments or the alternate method where a poly A segment or a poly B segment is reacted with an organic polyisocyanate to form a capped adduct and then coupling the capped adduct with the other segment to form an amphiphilic polymer. Amphiphilic polymers exhibit the property of dissolving or swelling in both aqueous and organic media and are of great interest and use in cosmetic, pharmaceutical, detergent, coating and oil recovery industries.

BACKGROUND ART

Amphiphilic polymers are commercially available in many types such as the well known poly(propylene oxide)/poly(ethylene oxide) block copolymers used as nonionic detergents and to produce polyurethanes, but the resulting polymers are essentially copolymers of the same class of monomers and the molecular weight of each segment is not readily controlled.

DISCLOSURE OF INVENTION

Novel amphiphilic polymers are produced having hydrophobic segments, viz., poly A segments, composed essentially of polymers of olefins having from 4 to about 12 carbon atoms and a hydrophilic segment, viz., poly B segments, composed essentially of poly(ethylene oxide) groups.

Thus, an aspect of this invention is to provide a method of producing amphiphilic polymers having the desired hydrophilic and hydrophobic segments extending from one or more urethane groups.

BEST MODE FOR CARRYING OUT THE INVENTION

Block copolymers having amphiphilic properties are readily prepared by capping either a hydroxyl terminated polymer of an olefin of 4 to 12 carbon atoms, such as polyisobutylene, also called PIB or a poly(ethylene glycol), also called PEG with an organic polyisocyanate such as tolylene diisocyanate, also called TDI, or diphenylmethane diisocyanate also called MDI and then coupling with the other polymer to give a polymer having hydrophilic-hydrophobic segments. Block copolymers of olefins of 4 to 12 carbon atoms, i.e., those of the di-, tri- and up to 6 block, are known and described. Their preparation is illustrated in Joseph P. Kennedy, et al., U. S. Pat. No. 4,276,394. These polymers are telechelic polyisobutylenes or related polyolefins which have at least one terminal halogen group. Phenol and its homologues were alkylated in the presence of a 10-fold excess of said phenol and equal moles of boron trifluoride diethyl etherate with an α-phenyl-ω-isopropenyl-polyisobutylene to give α-phenyl-PIB-ω-phenol according to the method described at Polymer Bulletin, Volume 8, page 563 (1982). The reaction product was recovered by washing with methanol and water and then precipitated from solution by pouring into a large excess of acetone. The precipitate was fractionated from hexanes/methyl ethyl ketone mixture to obtain the α-phenyl-PIB-ω-phenol of a narrow molecular weight distribution.

α-phenol-PIB-ω-phenol was prepared as described in Polymer Bulletin, Volume 8, page 563 (1982). These were made into 5 percent by weight solution of benzene and dried over magnesium sulfate, the magnesium sulfate was removed by filtration. The benzene solution (5 percent) of phenol-PIB-phenol was added dropwise to a TDI in benzene solution (1.2–1.5 times excess) at 45° C. containing a stannous octoate catalyst, with stirring to cap the phenol-PIB-phenol with the TDI. The isocyanate capped phenol-PIB-phenol in benzene solution was coupled with PEG as a 10 percent solution by the reaction of the unreacted NCO group thereof with the hydroxyl of the PEG. These reactions were carried out preferably under essentially anhydrous conditions to prevent reaction of the isocyanate end group with water.

Table I shows the molecular weights, molecular weight distributions, and number average end functionalities ($\bar{F}_n$) of $C_6H_5$-PIB-$C_6H_4OH$ and $HOC_6H_4$-PIB-$C_6H_4OH$ used in preparing amphiphilic polymers of this invention. M and B indicate a mono- and bifunctional polymer, respectively, and the last number in the formula shows the molecular weight $\times 10^{-3}$. For example, PIB-M-12 stands for a monofunctional PIB of $\bar{M}_n = 12,000$. Thus $\bar{M}$ may have values of about 500, 2,000, 3,000 to 30,000. The amphiphilic polymers may have 10 to 80 percent and preferably 20 to 60 percent of poly segment A. Poly segment B may be present in 90 to 20 percent and preferably 80 to 40 percent.

The $\bar{F}_n$'s obtained are close to theoretical values i.e., $\bar{F}_n = 1$ for monofunctional, and $\bar{F}_n = 2$ for bifunctional polymers, indicating quantitative alkylation of the starting phenol. The phenol ended PIBs were capped by TDI. The IR spectra of a representative sample before and after TDI capping were determined. After the reaction with TDI and the absorption at 3650 cm$^{-1}$ associated with phenolic OH groups disappeared, and a new absorption corresponding to the NH stretching mode in the urethane linkage appeared. This indicates essentially complete capping of the phenol end groups by TDI. The molecular weights of representative TDI capped PIBs were determined by GPC method and they were essentially the same as those of the starting materials. Evidently chain extension is absent during capping.

Table II shows the molecular weights, molecular weight distributions and $\bar{F}_n$ of the commercial PEGs used.

The compositions, blocking efficiencies ($B_{eff}$) and molecular weights of representative block copolymers prepared according to this invention are listed in Table III.

TABLE I

Molecular Weights, Molecular Weight Distributions and Functionalities of α-phenyl-ω-(p-phenol)polyisobutylene and α, ω-di (p-phenol)polyisobutylene

| Polymer | $\bar{M}_n{}^a$ | $\bar{M}_w/\bar{M}_n{}^b$ | $\bar{F}_n{}^c$ |
|---|---|---|---|
| PIB-M-12 | 12,000 | 1.66 | 0.08 ± 0.07 |

TABLE I-continued

Molecular Weights, Molecular Weight Distributions and Functionalities of α-phenyl-ω-(p-phenol)polyisobutylene and α, ω-di (p-phenol)polyisobutylene

| Polymer    | $\overline{M}_n{}^a$ | $\overline{M}_w/\overline{M}_n{}^b$ | $\overline{F}_n{}^c$ |
|------------|---------|-----------|-----------------|
| PIB-M-5.5  | 5,500   | 1.32      | 1.03 ± 0.05     |
| PIB-M-4.5  | 4,500   | 1.75      | 1.08 ± 0.06     |
| PIB-M-2.8  | 2,800   | 1.27      | 1.09 ± 0.05     |
| PIB-B-8.8  | 8,800   | 1.78      | 1.92 ± 0.10     |

$^a$by VPO
$^b$by GPC
$^c$by UV
where VPO, GPC and UV designates the analytic method used.

TABLE II

Molecular Weights, Molecular Weight Distributions and Functionalities of Poly(ethylene glycols)

| Polymer  | $\overline{M}_n{}^a$ | $\overline{M}_w/\overline{M}_n{}^b$ | $\overline{F}_n{}^c$ |
|----------|---------|-----------|-----------------|
| PEG-M-5  | 5,000   | 1.05      | 1.11 ± 0.07     |
| PEG-B-14 | 13,800  | 1.10      | 2.07 ± 0.11     |

$^a$by VPO
$^b$by GPC
$^c$by IR

TABLE III

Compositions, Blocking Efficiencies and Molecular Weights of PIB/PEG Block Copolymers

| Block Copolymers | $B_{eff}$ % | Composition$^a$ (wt %) PIB | Composition$^a$ (wt %) PEG | $\overline{M}_n{}^d$ (g/mole) |
|---|---|---|---|---|
| PIB-M-12-b-PEG-M-5 | — | 74 | 26 | 23,000 |
| PIB-M-4.5-b-PEG-M-5 | 75$^b$ | 62 | 38 | 15,000 |
| PIB-M-2.8-b-PEG-M-5 | 88$^c$ | 24 | 76 | 6,900 |
| PIB-M-5.5-b-PEG-B-14-b-PIB-M-5.5 | 85$^c$ | 38 | 62 | 25,000 |
| PEG-M-5-b-PIB-B-8.8-b-PEG-M-5 | — | 65 | 35 | 17,000 |

$^a$by H—NMR
$^b$by Solvent extraction by hexanes
$^c$by IR
$^d$by composition and $M_n$ of PEGs The UV trace indicates the presence of a chromophore in the polymer. The PEG does not contain a chromophore and does not exhibit a UV response (the peak at highest elution count). In contrast, the block copolymer and the self-coupled PEG contain a phenyl urethane linkage and exhibit strong UV response.

Efforts have been made to purify the block copolymers by solvent extraction and/or precipitation techniques, however, all these procedures failed because of the extreme emulsifying activity of the amphiphilics. In contrast, satisfactory separations have been obtained by column chromatography. GPC traces of a representative crude product, together with the benzene-eluted and 95 percent benzene/5 percent methanol-eluted fractions obtained by column chromatography, were obtained. The benzene-eluted fraction gives a smooth unimodal GPC trace and does not show peaks corresponding to those of homopolymers (original or self-coupled PEG) indicating that this fraction does not contain homoPEG. By using a slightly more polar solvent mixture (95 percent benzene/5 percent methanol) homoPEG started to be eluted. The GPC trace contains a peak at a lower elution count (higher molecular weight): this peak is eluted at a lower count than that of the original PIB indicating that it corresponds to the block copolymer. Although the PEG-rich block copolymer could not be isolated (due to unavoidable fractionation by column chromatography), the low PEG content block copolymer (benzene-eluted fraction) was separated without appreciable homoPEG contamination.

The first three materials in Table III are diblock copolymers; the first two were prepared by coupling PEG-M-5 with TDI-capped monofunctional PIBs whereas the third one was obtained by coupling C$_6$H$_5$-PIB-C$_6$H$_4$OH with TDI-capped monofunctional PEG of $\overline{M}_n$=5000. The fourth and fifth entries were synthesized by first capping with TDI the prepolymer that was to provide the center block (i.e., HO-PEG-OH in the fourth and HOC$_6$H$_4$-PIB-C$_6$H$_4$OH in the fifth row) and subsequently coupling with the prepolymer of the outer block (i.e., C$_6$H$_5$-PIB-C$_6$H$_4$OH in the fourth and PEG-OH in the fifth row). MDI and related aromatic polyisocyanates could be used as well as the well known aliphatic and cycloaliphatic polyisocyanates, i.e., 1,6-hexane ethylene diisocyanate or 1,4-cyclohexyl diisocyanate to cap and couple these center blocks to yield the amphiphilic polymers of this invention.

In the cases of the PEG-centered triblock copolymer and the long-PEG short-PIB diblock copolymer, i.e., entries four and three in Table III, homoPIB was first eluted by benzene and the block copolymer was obtained by washing the column with a benzene/methanol mixture that contained 30-50 percent methanol.

Efforts have been made to determine the molecular weights of the block copolymers by VPO method, however, due to the purification difficulties (presence of trace amounts of solvent) reliable values could not be obtained. Thus, block copolymer molecular weights were estimated from compositions obtained by $^1$H-NMR spectroscopy and the molecular weight of the PEG segment. Since the molecular weight distributions of the PEGs are very narrow ($\overline{M}_w/\overline{M}_n < 1.10$), the molecular weights of PEG segments in the block copolymers appear to be identical to those of the original PEGs.

Blocking efficiency, i.e., the percent of TDI capped polymer incorporated in the block copolymer, was estimated by IR or $^1$H-NMR spectroscopy. In the cases of PIB-M-2.8-b-PEG-M-5 and PIB-M-5.5-b-PEG-14-6-PIB-M-5.5 the concentration of free phenolic OH groups were determined by IR spectroscopy employing very low sample concentrations ($\sim$10$^{-4}$ mole/l in CCl$_4$). Based on the amount of free OH and known amounts of PIB, TDI and PEG charged, the blocking efficiencies could be calculated. In the case of PIB-M-4.5-b-PEG-M-5, solvent extraction by hexanes were carried out and the amount of homoPIB was determined by subtracting the amount of the block copolymer from the total amount of the hexanes-soluble fraction. The amount of the block copolymer in the hexanes-soluble fraction was calculated from the composition of the hexanessoluble fraction and assuming that the PEG is incorporated in the block copolymer and that the composition of the block copolymer is the expected value, i.e., the PIB/PEG weight ratio is 4.5/5. In both cases, minimum values are obtained because the presence of impurities (such as water) will reduce the value in the former cases, and the real PIB content in the block copolymer should be higher than the expected value in the latter case. Thus, the blocking efficiencies in these systems were found to be higher than 80 percent.

While in accordance with the patent statutes, a preferred embodiment and best mode has been set forth in detail, the scope of the invention is limited by the scope of the attached claims.

What is claimed is:

1. An amphiphilic polymer composed of at least one poly A segment and at least one poly B segment that are coupled together by reaction with an organic polyisocyanate to form urethane groups,
    said poly A segment being an aromatic moiety or moieties-terminated polyolefin having monomer residues residing therein containing from 4 to about 12 carbon atoms with at least one of said aromatic moities containing a hydroxyl group, and said poly B segment being an alkylene oxide polymer of ethylene oxide or propylene oxide having at least one terminal hydroxyl group.

2. The amphiphilic polymer composed of at least one poly A segment and at least one poly B segment that are coupled together by reaction with an organic polyisocyanate to form urethane groups, said poly A segment is polyisobutylene block having at least one aromatic moiety at each end with at least one of said moieties containing a hydroxyl group and the poly B segment is ethylene oxide polymer having at least one terminal hydroxyl group.

3. The amphiphilic polymer of claim 2 wherein the poly A segment is selected from the class consisting of $C_6H_5$-PIB-$C_6H_4$-OH and HO$C_6H_4$-PIB-$C_6H_4$OH where PIB is polyisobutylene.

4. The amphiphilic polymer of claim 1 wherein the molecular weight of the poly A segment varies from 500 to 30,000.

5. The amphiphilic polymer of claim 2 wherein the molecular weight varies from 500 to 30,000.

6. The amphiphilic polymer of claim 3 wherein the molecular weight varies from 500 to 30,000.

7. The amphiphilic polymer of claim 1 wherein the organic polyisocyanate is an aromatic polyisocyanate.

8. The amphiphilic polymer of claim 1 wherein the aromatic polyisocyanate is tolylene diisocyanate and methylene diphenylmethane diisocyanate.

9. The amphiphilic polymer of claim 1 wherein the organic polyisocyanate is an aliphatic or an cycloaliphatic polyisocyanate.

10. A method of making an amphiphilic polymer, comprising:
    capping a poly A segment or a poly B segment without regard to sequence with an organic polyisocyanate to form an adduct having at least one free NCO group and coupling said adduct with the other segment to give a polymer having hydrophilic groups and hydrophobic groups;
    said poly A segment being an aromatic moiety or moieties-terminated polyolefin having monomer residues therein containing from 4 to about 12 carbon atoms with at least one of said aromatic moieties containing a hydroxyl group and said poly B segment being an alkylene oxide polymer of ethylene oxide or propylene oxide having at least one terminal hydroxyl group.

11. The method of claim 10 wherein the organic polyisocyanate is selected from the class of tolylene diisocyanate and diphenylmethane diisocyanate.

12. The method of claim 10 wherein the organic polyisocyanate is reacted with poly A segment to give an adduct and then the adduct is reacted with the poly B segment.

13. The method of claim 12 wherein the polyisocyanate is selected from the class of tolylene diisocyanate and diphenylmethane diisocyanate.

14. The method of claim 10 wherein the poly A segment has a molecular weight of about 500 to 30,000.

15. The amphiphilic polymer of claim 1 wherein the poly A segment comprises about 10 to 80 percent by weight of the polymer.

16. The amphiphilic polymer of claim 1 wherein the poly B segment comprises about 20 to 90 percent by weight of the polymer.

17. A method of making a amphiphilic polymer, comprising:
    capping a poly A segment of a poly B segment without regard to sequence with an organic polyisocyanate to form an adduct having at least one free NCO group and coupling said adduct with the other segment to give a polymer having hydrophilic groups and hydrophobic groups;
    said poly A segment being an aromatic moiety or moieties-terminated polyisobutylene with at least one of said aromatic moieties containing a hydroxyl group and said poly B segment being an alkylene oxide polymer of ethylene oxide or propylene oxide having at least one terminal hydroxyl group.

* * * * *